US012563197B2

(12) United States Patent
Navarrete Michelini et al.

(10) Patent No.: US 12,563,197 B2
(45) Date of Patent: Feb. 24, 2026

(54) IMAGE PROCESSING METHOD

(71) Applicant: BOE TECHNOLOGY GROUP CO., LTD., Beijing (CN)

(72) Inventors: Pablo Navarrete Michelini, Beijing (CN); Yunhua Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 87 days.

(21) Appl. No.: 18/558,741

(22) PCT Filed: Jan. 4, 2023

(86) PCT No.: PCT/CN2023/070405
§ 371 (c)(1),
(2) Date: Nov. 3, 2023

(87) PCT Pub. No.: WO2023/142926
PCT Pub. Date: Aug. 3, 2023

(65) Prior Publication Data
US 2024/0244221 A1      Jul. 18, 2024

(30) Foreign Application Priority Data

Jan. 25, 2022    (CN) ........................ 202210086020.X

(51) Int. Cl.
*H04N 19/137*          (2014.01)
*H04N 19/105*          (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11); *H04N 19/33* (2014.11)

(58) Field of Classification Search
CPC .. H04N 19/137; H04N 19/105; H04N 19/132; H04N 19/176; H04N 19/33;
(Continued)

(56) References Cited

U.S. PATENT DOCUMENTS

2013/0294516 A1* 11/2013 Guduru ................. H04N 19/53
375/E7.125
2019/0087978 A1    3/2019 Tourapis et al.
(Continued)

FOREIGN PATENT DOCUMENTS

CN          102316317 A      1/2012
CN          102752588 A      10/2012
(Continued)

OTHER PUBLICATIONS

Granot N. et al., Drop the GAN: In Defense of Patches Nearest Neighbors as Single Image Generative Models, Aug. 24, 2021, Weizmann Artificial Intelligence Center.
(Continued)

*Primary Examiner* — Hesham K Abouzahra
(74) *Attorney, Agent, or Firm* — XSENSUS LLP

(57) ABSTRACT
An image processing method includes: obtaining a current image frame and a reference image frame; sequentially performing downsampling and upsampling on the current image frame to obtain a processed current image frame, and sequentially performing downsampling and upsampling on the reference image frame to obtain a processed reference image frame; according to a preset division manner, dividing the processed current image frame into current image sub-blocks and dividing the processed reference image frame into reference image sub-blocks; determining a reference image sub-block with a minimum similarity to each current image sub-block among the reference image sub-blocks as a matching block of the current image sub-block; obtaining a
(Continued)

Current image frame

Processed current image frame

Down-sampl-ing

Up-sampl-ing

Reference image frame

Processed reference image frame

Down-sampl-ing

Up-sampl-ing motion vector corresponding to the current image sub-block based on each current image sub-block and the matching block corresponding to the current image sub-block; and encoding the current image frame based on the motion vector.

20 Claims, 8 Drawing Sheets

(51) Int. Cl.
| | |
|---|---|
| *H04N 19/132* | (2014.01) |
| *H04N 19/176* | (2014.01) |
| *H04N 19/33* | (2014.01) |

(58) Field of Classification Search
CPC ...... H04N 19/513; H04N 19/53; H04N 19/59; H04N 19/139; H04N 19/122; H04N 19/51; H04N 19/625; G06F 17/14
See application file for complete search history.

(56) References Cited

U.S. PATENT DOCUMENTS

| | | | |
|---|---|---|---|
| 2020/0154129 A1 | 5/2020 | Su et al. | |
| 2020/0389665 A1* | 12/2020 | Gao ..................... | H04N 19/513 |
| 2021/0084291 A1 | 3/2021 | Chang et al. | |

FOREIGN PATENT DOCUMENTS

| | | | | |
|---|---|---|---|---|
| CN | 103929648 A | 7/2014 | | |
| CN | 104427345 A | 3/2015 | | |
| CN | 108702512 A | 10/2018 | | |
| CN | 108833917 A | 11/2018 | | |
| CN | 111447454 A | * 7/2020 | ........... | H04N 19/103 |
| CN | 112738517 A | 4/2021 | | |
| CN | 113597764 A | 11/2021 | | |
| CN | 113747165 A | 12/2021 | | |
| CN | 114531596 A | 5/2022 | | |

OTHER PUBLICATIONS

HEVC-AVC motion search methods.
The First Office Action mailed Jan. 11, 2025, in Chinese Application No. 202210086020.X, 22 pages including English Translation.
The Second Office Action mailed Jun. 6, 2025, in Chinese Application No. 202210086020.X, 22 pages including English translation.

* cited by examiner

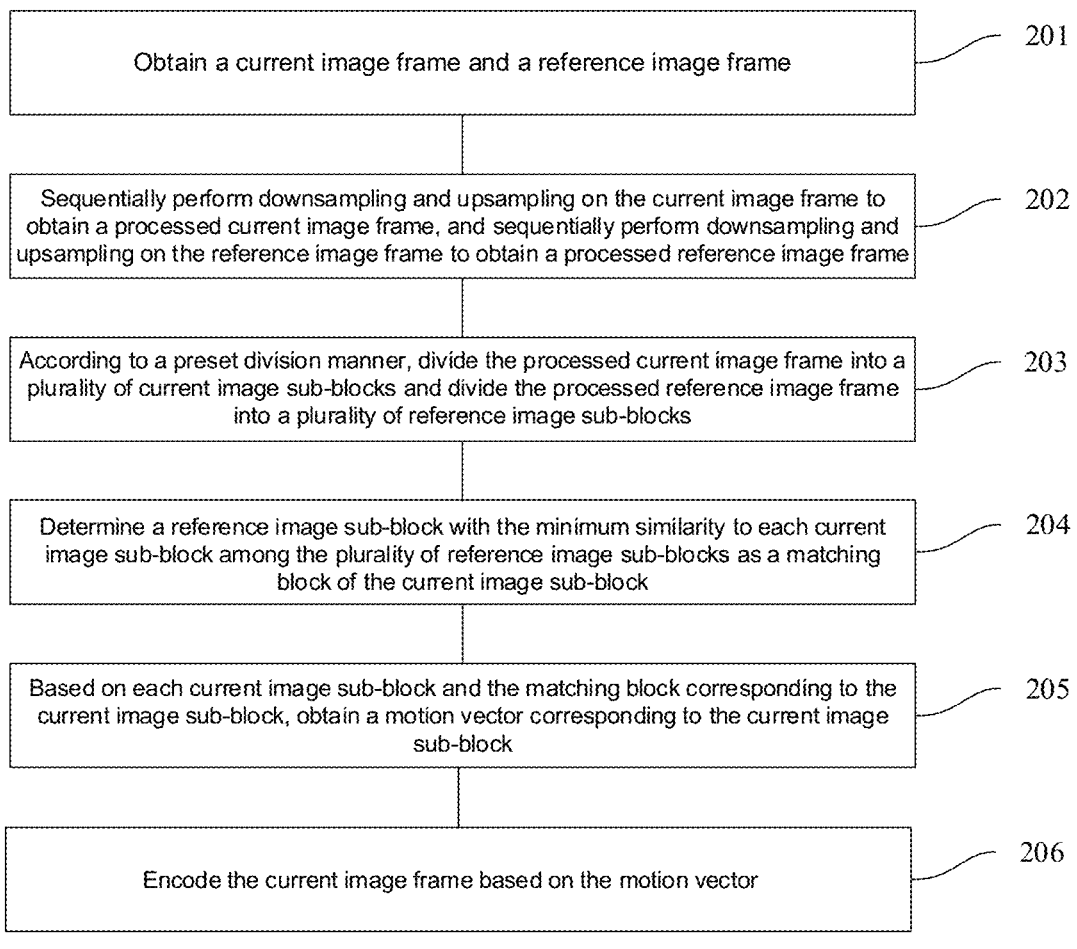

| | |
|---|---|
| Obtain a current image frame and a reference image frame | 201 |
| Sequentially perform downsampling and upsampling on the current image frame to obtain a processed current image frame, and sequentially perform downsampling and upsampling on the reference image frame to obtain a processed reference image frame | 202 |
| According to a preset division manner, divide the processed current image frame into a plurality of current image sub-blocks and divide the processed reference image frame into a plurality of reference image sub-blocks | 203 |
| Determine a reference image sub-block with the minimum similarity to each current image sub-block among the plurality of reference image sub-blocks as a matching block of the current image sub-block | 204 |
| Based on each current image sub-block and the matching block corresponding to the current image sub-block, obtain a motion vector corresponding to the current image sub-block | 205 |
| Encode the current image frame based on the motion vector | 206 |

FIG. 2

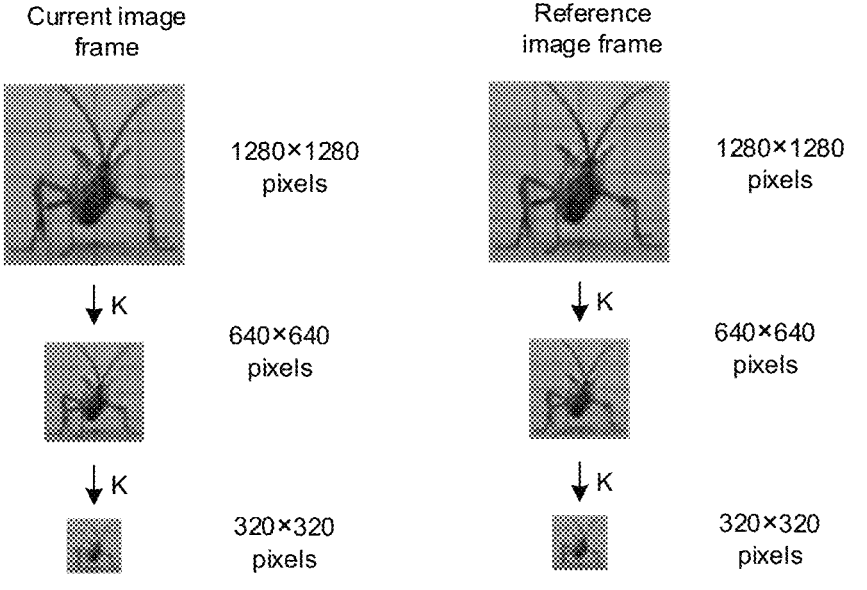

Current image frame

Reference image frame

1280×1280 pixels

1280×1280 pixels

↓K

↓K

640×640 pixels

640×640 pixels

↓K

↓K

320×320 pixels

320×320 pixels

FIG. 3

Current image
frame

Processed current
image frame

Reference
image frame

Processed reference
image frame

Current image
frame

Reference
image frame

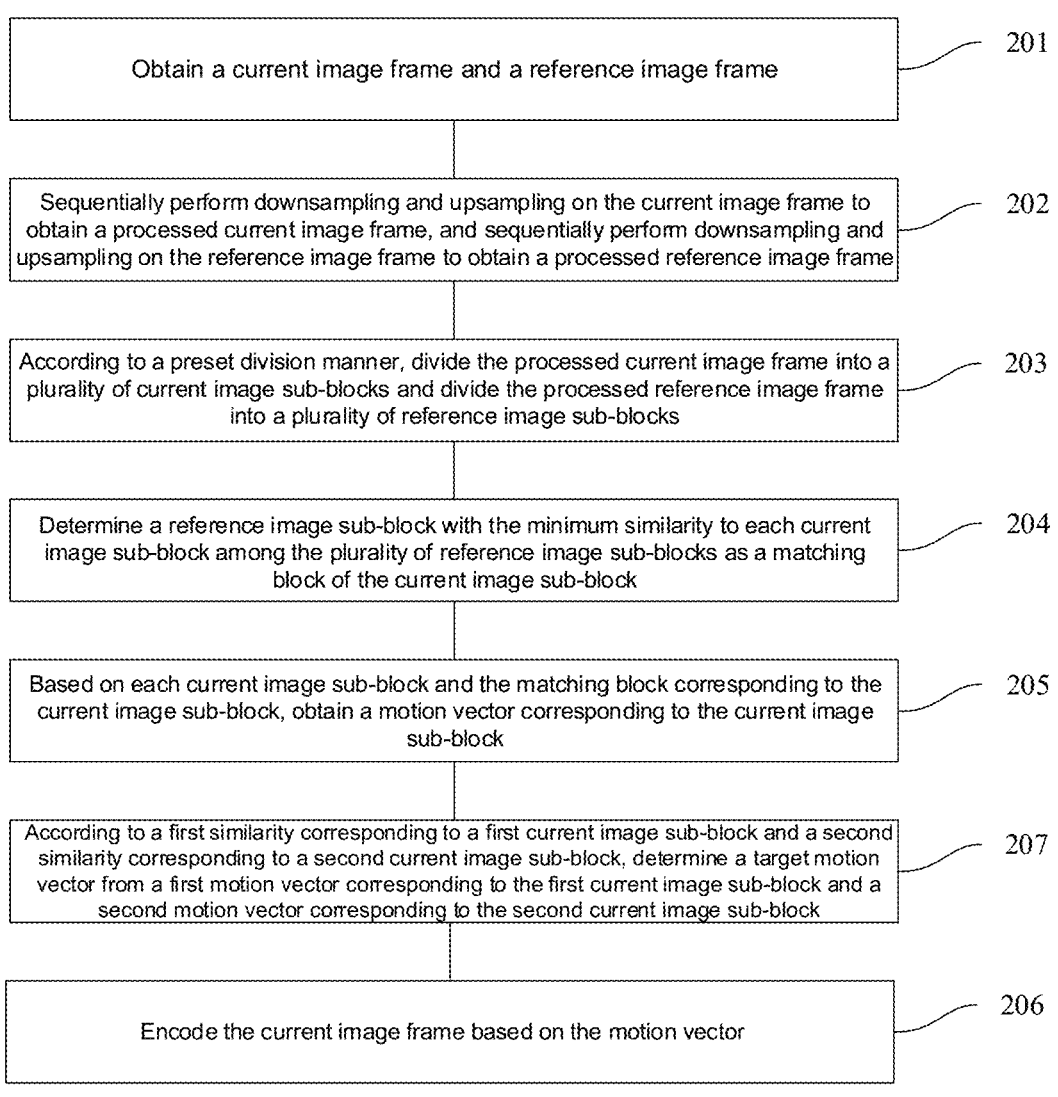

Obtain a current image frame and a reference image frame — 201

Sequentially perform downsampling and upsampling on the current image frame to obtain a processed current image frame, and sequentially perform downsampling and upsampling on the reference image frame to obtain a processed reference image frame — 202

According to a preset division manner, divide the processed current image frame into a plurality of current image sub-blocks and divide the processed reference image frame into a plurality of reference image sub-blocks — 203

Determine a reference image sub-block with the minimum similarity to each current image sub-block among the plurality of reference image sub-blocks as a matching block of the current image sub-block — 204

Based on each current image sub-block and the matching block corresponding to the current image sub-block, obtain a motion vector corresponding to the current image sub-block — 205

According to a first similarity corresponding to a first current image sub-block and a second similarity corresponding to a second current image sub-block, determine a target motion vector from a first motion vector corresponding to the first current image sub-block and a second motion vector corresponding to the second current image sub-block — 207

Encode the current image frame based on the motion vector — 206

FIG. 12

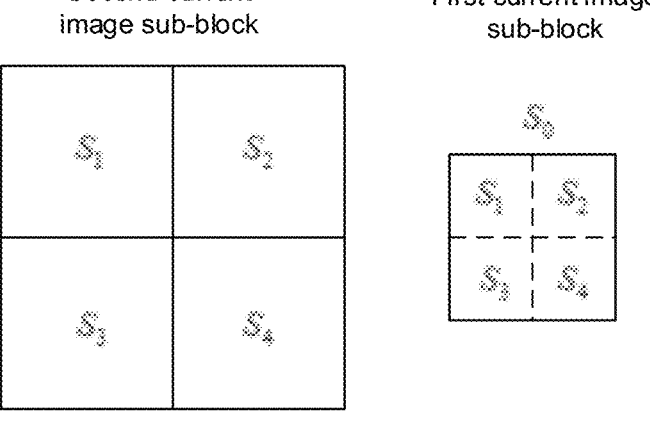

Second current image sub-block

First current image sub-block

FIG. 13

IMAGE PROCESSING METHOD

CROSS-REFERENCE TO RELATED APPLICATIONS

This application is a national phase entry under 35 USC 371 of International Patent Application No. PCT/CN2023/070405, filed on Jan. 4, 2023, which claims priority to Chinese Patent Application No. 202210086020.X, filed with the China National Intellectual Property Administration on Jan. 25, 2022, titled "IMAGE PROCESSING METHOD AND APPARATUS", which are incorporated herein by reference in their entirety.

TECHNICAL FIELD

The present disclosure relates to the field of image technologies, and in particular, to a data processing method.

BACKGROUND

At present, when encoding image frames, in order to reduce the amount of encoded data of the image frames, inter-frame coding may be performed on the current image frames. When performing the inter-frame coding on the current image frame, the encoded image block that is most similar to the current image block may be searched in the reference image frame and is used as the matching block of the current image block. The offset between the current image block and the matching block is used as the motion vector, and the motion vector is encoded, so that the decoder can obtain the position of the current image block according to the motion vector.

SUMMARY

In a first aspect of the embodiments of the present disclosure, an image processing method is provided. The method includes: firstly, obtaining a current image frame and a reference image frame; sequentially performing downsampling and upsampling on the current image frame to obtain a processed current image frame, sequentially performing downsampling and upsampling on the reference image frame to obtain a processed reference image frame; then, according to a preset division manner, dividing the processed current image frame into a plurality of current image sub-blocks and dividing the processed reference image frame into a plurality of reference image sub-blocks; determining a reference image sub-block with a minimum similarity to each current image sub-block among the plurality of reference image sub-blocks as a matching block of the current image sub-block; obtaining a motion vector corresponding to the current image sub-block based on each current image sub-block and the matching block corresponding to the current image sub-block; and then, encoding the current image frame based on the motion vector.

In combination with the first aspect, in a possible implementation manner, the current image frame is an original current image frame or an image frame obtained after scaling the original current image frame at least once by using a scaling factor, and the reference image frame is an original reference image frame or an image frame obtained after scaling the original reference image frame at least once by using the scaling factor.

In combination with the first aspect and the above possible implementation, in another possible implementation, within a search area corresponding to the current image sub-block, distances between reference image sub-blocks within the search area and the current image sub-block are calculated; regularization is performed on the distances between the reference image sub-blocks within the search area and the current image sub-block to obtain a plurality of candidate similarities; and a reference image sub-block corresponding to a minimum similarity among the plurality of candidate similarities is determined as the matching block of the current image sub-block.

In combination with the first aspect and the above possible implementations, in another possible implementation manner, the minimum similarity among the plurality of candidate similarities corresponding to each current image sub-block is a similarity corresponding to the current image sub-block.

In combination with the first aspect and the above possible implementations, in another possible implementation, the method further includes: according to a first similarity corresponding to a first current image sub-block and a second similarity corresponding to a second current image sub-block, determining a target motion vector from a first motion vector corresponding to the first current image sub-block and a second motion vector corresponding to the second current image sub-block. The first current image sub-block is an image block obtained by scaling the second current image sub-block.

In combination with the first aspect and the above possible implementations, in another possible implementation, the first similarity and the second similarity are compared; in a case where the first similarity is less than or equal to the second similarity, the first motion vector is determined as the target motion vector; and in a case where the first similarity is greater than the second similarity, the second motion vector is determined as the target motion vector.

In combination with the first aspect and the above possible implementations, in another possible implementation, the current image frame is encoded based on the target motion vector.

In a third aspect of the embodiments of the present disclosure, a non-transitory computer-readable storage medium is provided. The computer-readable storage medium has stored computer program instructions that, when executed by a computer (e.g., an image processing device), cause the computer to perform the image processing method as described in any of the above embodiments.

In a fourth aspect of the embodiments of the present disclosure, a computer program product is provided. The computer program product is stored on a non-transitory computer-readable storage medium, and includes computer program instructions that, when executed by a computer (e.g., an image processing device), cause the computer to perform the image processing method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

FIG. 2 is a flow diagram of an image processing method provided in some embodiments of the present disclosure;

FIG. 3 is a diagram showing an application of an image processing method provided in some embodiments of the present disclosure;

FIG. 12 is a flow diagram of another image processing method provided in some embodiments of the present disclosure;

FIG. 13 is a diagram showing an application of yet another image processing method provided in some embodiments of the present disclosure.

DETAILED DESCRIPTION

Figure 1:
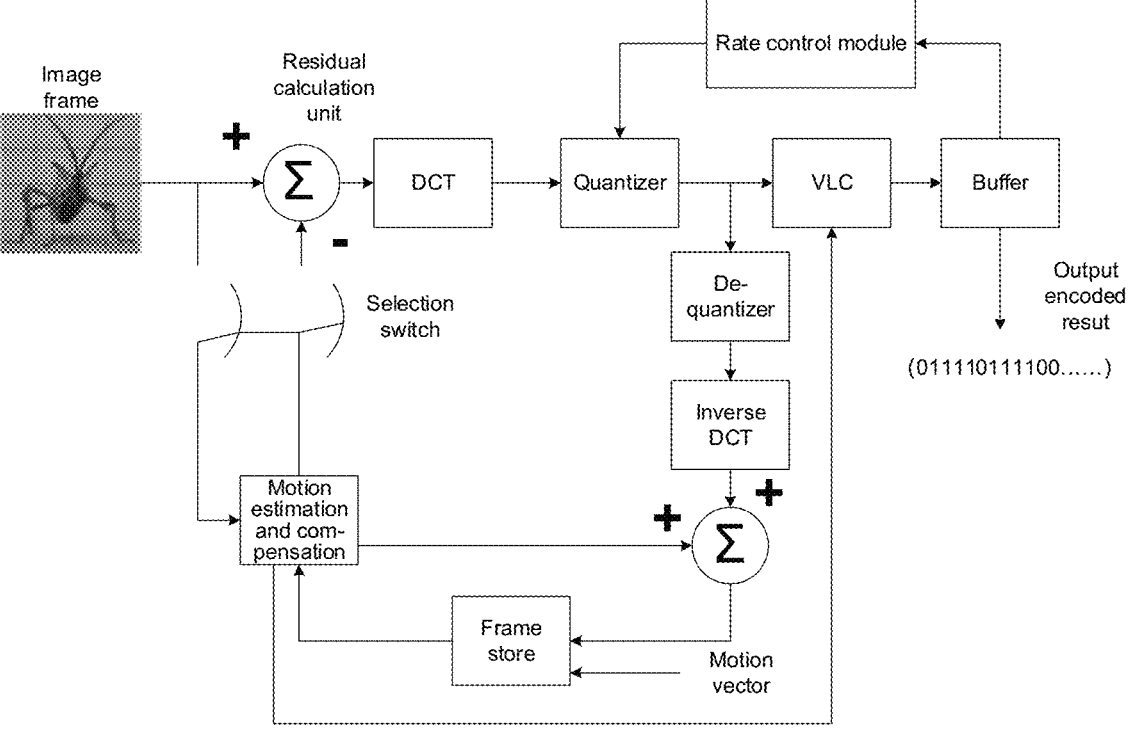
FIG. 1 is a schematic diagram showing a structure of an image editor provided in some embodiments of the present disclosure.

The technical solutions in some embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment". "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" or "the plurality of" means two or more unless otherwise specified.

The phrase "A and/or B" includes the following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

In addition, the use of the phrase "based on" is meant to be open and inclusive, since a process, step, calculation or other action that is "based on" one or more of the stated conditions or values may, in practice, be based on additional conditions or values beyond those stated.

First, some of the terms in the embodiments of the present disclosure are briefly introduced.

Downsampling refers to shrinking image frames. By downsampling, the image frames fit the size of the display region, or thumbnails of the image frames are generated. For example, an image frame with a scale of M×N pixels is downsampled by c times to obtain an image frame of (M/c)×(N/c) pixels, where c is a common divisor of M and N.

Upsampling (or called image interpolation) refers to enlarging image frames. The image frames are displayed on display devices with high resolution through upsampling. Upsampling almost always adopts the interpolation method, that is, on the basis of the pixels of the original image frame, new elements are inserted between the pixels using a suitable interpolation algorithm.

Intra-frame coding refers to a coding manner that performs discrete cosine transform (DCT), zigzag scanning, quantization processing, variable length coding (VLC), etc. on image frames during image compression processing.

Inter-frame coding refers to a coding manner that uses the time redundancy of video images to encode motion vectors and texture (predictive residual) information between image frames during image compression processing.

Next, the system architecture involved in the present disclosure will be introduced.

FIG. 1 is a structural diagram of an image encoder, which is applied to the method provided by the present disclosure, provided in the embodiments of the present disclosure. The image encoder includes a residual calculation unit, a selection switch, a DCT module, a quantizer, a VLC module, a buffer, a rate control module, a de-quantizer, an inverse DCT module, a frame store module, and a motion estimation and compensation module.

As shown in FIG. 1, the image encoder receives an image frame through an input interface. For example, the image frame may be an image frame in a sequence of pictures forming a video or a video sequence. The image frame received by the image encoder may also be referred to as a current image frame or a to-be-encoded image frame. The image encoder may perform the intra-frame coding or the inter-frame coding on the received image frame.

The selection switch is used to select an image compression method of the intra-frame coding or an image compression method of the inter-frame coding when compressing the image. In order to well compress the image, the intra-frame coding is generally used for still images (pictures), and the inter-frame coding is generally used for moving images (video).

The residual calculation unit is used to calculate the residual based on the current image frame and the predicted image frame. The DCT module is used to convert the image from the spatial domain to the frequency domain for image compression. In the spatial domain, the contents of the images vary greatly. However, in the frequency domain, after statistical analysis of a large number of images, it is found that after the images are subjected to the DCT, the main components of the frequency coefficients are concentrated in a small range and mainly located in the low frequency part. According to the statistical characteristics of the image signal in the frequency domain, some measures are adopted to discard the less energy part in the spectrum, and retain the main frequency component in the transmission spectrum as much as possible, so as to achieve the purpose of image data compression.

The quantizer is used to process the frequency data processed by the DCT module to further compress the amount of data. Since human eyes have different sensitivities to various frequencies, the frequency data processed by the DCT module may be quantized, and the quantized DCT coefficient matrix will have many zero values. Generally, the quotient of the data in the upper left corner is non-zero, and the quotient of the data in the lower right corner is very small and may be simplified to 0 after being rounded to an integer. There are many 0 values in the coefficient matrix, so that the amount of data is greatly reduced. The main part of the image information is retained, and the image data is compressed.

The VLC module is used to encode the above quantized coefficient matrix. During encoding, the VLC module converts the quantized coefficients into a one-dimensional array through the zigzag scanning. The tail of the one-dimensional array has a plurality of "0", and the plurality of "0" may be replaced by other forms, which return to the plurality of "0" during decoding to fill up the 64 bits of the matrix. Therefore, the image data is further compressed through the VLC. For example, 00000000 may be represented as 80, which returns to 00000000 when being decoded.

For still images, the intra-frame coding of image data is completed through the DCT module, quantizer and VLC module, so that the amount of image data is reduced. The buffer is used to temporarily store image compression data.

The rate control module is used to adjust the code rate of the image according to the data cache amount of the buffer. The code rate is higher when the image is more complex, and the code rate is lower when the image is simpler. The rate control module is used to control the code rate within a certain range.

The de-quantizer and the inverse DCT module are used to restore the encoded image data to the image data before encoding as the reference image frame.

The frame store is used to store reference frames and motion vectors.

The motion estimation and compensation module is used to calculate motion vectors and motion residuals according to the reference image frames and the current image frames.

For moving images, the inter-frame coding of image data may be performed according to reference frames, motion vectors and motion residuals to reduce the amount of image data.

At present, in the image processing process of inter-frame coding, the searched matching block may not be the optimal matching block, resulting in inaccurate motion vectors, which will lead to a large bit stream and require a large storage space. In addition, the inaccurate motion vectors will reduce the image quality. In order to solve the problems, embodiments of the present disclosure provide an image processing method, which can find the optimal matching block and obtain a more accurate motion vector, and in turn reduce the bit stream and improve the image quality.

FIG. 2 is a flow diagram of the image processing method provided in the embodiments of the present disclosure. As shown in FIG. 2, the method includes steps 201 to 206.

In 201, a current image frame and a reference image frame are obtained.

Referring to FIG. 1, the current image frame is an image frame received by the encoder, and the reference image frame is an image frame restored from encoded image data through the de-quantizer and the inverse DCT module.

Optionally, the current image frame may be an original current image frame or an image frame obtained after scaling the original current image frame at least once by using a scaling factor K, and the reference image frame may be an original reference image frame or an image frame obtained after scaling the original reference image frame at least once by using the scaling factor K. The embodiments of the present disclosure do not limit whether the current image frame and the reference image frame are scaled, and not limit the specific value of the scaling factor K. The following embodiments are described by taking the scaling factor K equal to 2 as an example.

The number of times that the current image frame can be scaled and the number of times that the reference image frame can be scaled are related to the image coding standard. For example, the image coding standard is moving picture experts group-2 (MPEG2); since MPEG2 only supports image blocks of 8×8, the current image frame and the reference image frame are not scaled. In this case, the current image frame is an unscaled current image frame (also called an original current image frame), and the reference image frame is an unscaled reference image frame (also called an original reference image frame). Considering an example in which the image coding standard is high efficiency video coding (HEVC), since HEVC supports image blocks of 4×4, 8×8, 16×16, 32×32, and 64×64, the scaling factor of 2 may be used to scale the current image frame and the reference image frame 4 times to obtain current image frames and reference image frames in 5 levels, and the scales of the current image frames and reference image frames in 5 levels are gradually reduced. The embodiments of the present application do not limit the coding standard used for image coding, the specific magnitude of the scaling coefficient, and the specific scaling times. For the convenience of description, the embodiments will be described below by taking an example in which the scaling factor is 2 and the current image frame and the reference image frame are each scaled twice.

As shown in FIG. 3, for example, the size of the current image frame is 1280×1280, the size of the reference image frame is 1280×1280, the scaling factor K is 2, and the scaling is performed twice. Firstly, the current image frame of 1280×1280 and the reference image frame of 1280×1280 are each scaled once by using the scaling factor of 2, so as to obtain a current image frame of 640×640 pixels and a reference image frame of 640×640 pixels. Then, the current image frame of 640×640 pixels and the reference image frame of 640×640 pixels are each scaled once by using the scaling factor of 2, so as to obtain a current image frame of 320×320 pixels and a reference image frame of 320×320 pixels. That is, when the scaling is performed twice, three levels of current image frame and reference image frame of three levels may be obtained. The first level is the current image frame of 1280×1280 pixels and the reference image frame of 1280×1280 pixels, the second level is the current image frame of 640×640 pixels and the reference image frame of 640×640 pixels, and the third level is the current image frame of 320×320 pixels and the reference image frame of 320×320 pixels.

In 202, downsampling and upsampling are sequentially performed on the current image frame to obtain a processed current image frame, and downsampling and upsampling are sequentially performed on the reference image frame to obtain a processed reference image frame.

Figure 4:
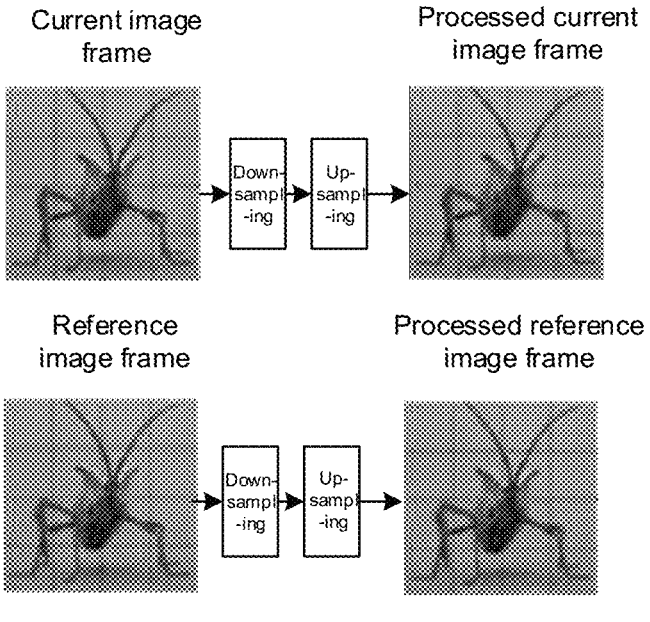
FIG. 4 is a diagram showing an application of another image processing method provided in some embodiments of the present disclosure.

As shown in FIG. 4, considering an example in which the current image frame and the reference image frame cannot be scaled, the downsampling and upsampling are sequentially performed on the current image frame $x_n$ to obtain the processed current image frame $x_{n+1}$, and the downsampling and upsampling are sequentially performed on the reference image frame $y_n$ to obtain the processed current image frame $y_{n+1}$.

Optionally, when the reference image frame has been scaled multiple times, in order to avoid the loss of image information, a reference image frame obtained by scaling the most times may not be downsampled and upsampled, and the reference image frame obtained by scaling the most times may be directly used as the processed reference image frame. The embodiments of the present application do not limit whether the reference image frame obtained by scaling the most times is downsampled and upsampled. The embodiments will be described below by taking an example in which the reference image frame obtained by scaling the most times is not subjected to downsampling and upsampling.

Figure 5:
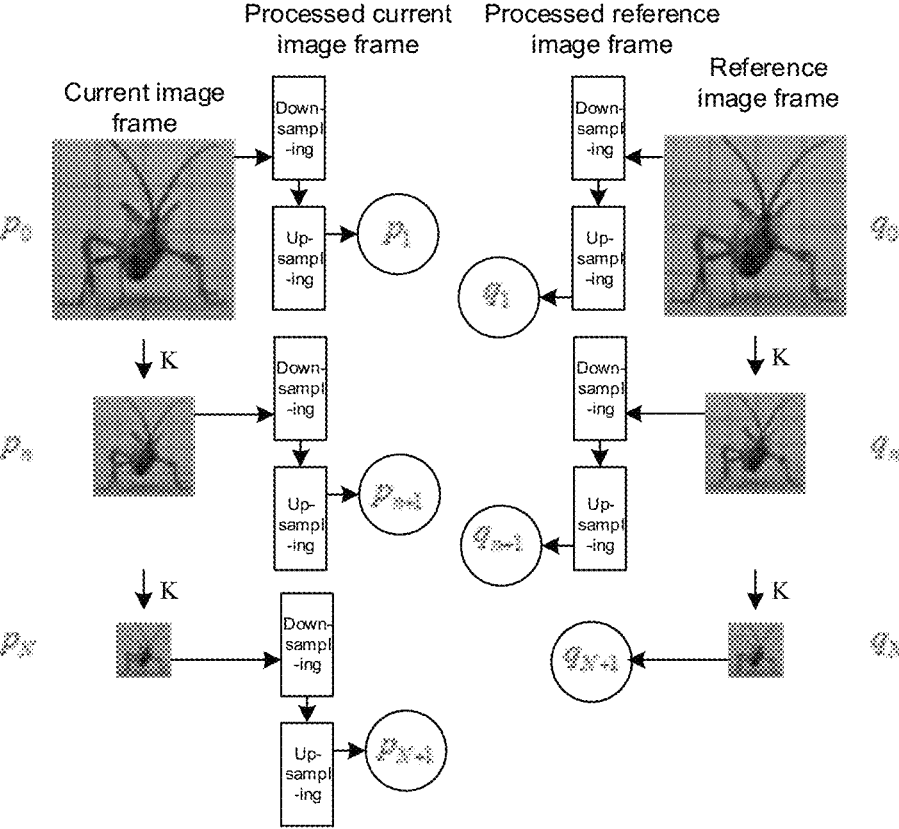
FIG. 5 is a diagram showing an application of yet another image processing method provided in with some embodiments of the present disclosure.

As shown in FIG. 5, for example, the current image frame is an image frame of 1280×1280 pixels, the reference image frame is an image frame of 1280×1280 pixels, the scaling factor K is 2, and scaling is performed twice. The downsampling and upsampling are sequentially performed on the current image frame $p_0$ of 1280×1280 pixels to obtain the processed current image frame $p_1$, the downsampling and upsampling are sequentially performed on the current image frame $p_n$ of 640×640 pixels to obtain the processed current image frame $p_{n+1}$, and the downsampling and upsampling are sequentially performed on the current image frame $p_N$ of 320×320 pixels to obtain the processed current image frame $p_{N+1}$. The downsampling and upsampling are sequentially performed on the reference image frame $q_0$ of 1280×1280 pixels to obtain the processed reference image frame $q_1$; the downsampling and upsampling are sequentially performed on the reference image frame $q_n$ of 640×640 pixels to obtain the processed reference image frame $q_{n+1}$; and the reference image frame $q_N$ of 320×320 pixels is not subjected to downsampling and upsampling, and the reference image frame $q_N$ is used as the processed reference image frame $q_{N+1}$.

In the image processing method provided in the embodiments of the present disclosure, the current image frame and the reference image frame are each scaled at least once to obtain current image frames of different scales and reference image frames of different scales; and a current image frame and a reference image frame of a corresponding size are subjected to downsampling and upsampling processing to reduce the high-frequency parts that do not represent the main information of the current image frame and the reference image frame, the noise signals are filtered, and then the optimal matching block of each current image sub-block under each scale can be obtained accurately according to the processed current image frame and the processed reference image frame.

In 203, according to a preset division manner, the processed current image frame is divided into a plurality of current image sub-blocks, and the processed reference image frame is divided into a plurality of reference image sub-blocks.

For different image coding standards, different preset division manners are used. If the image coding standard supports one division manner, this division manner is used as the preset division manner. If the image coding standard supports multiple division manners, the division manner with the least number of pixels is used as the preset division manner. The embodiments of the present disclosure do not limit which the division manner is specifically used as the preset division manner.

For example, the image coding standard is MPEG2; since MPEG2 only supports image blocks of 8×8 pixels, the preset division manner is to divide the processed current image frame into the plurality of current image sub-blocks and divide the processed reference image frame into the plurality of reference image sub-blocks by using the size of 8×8 pixels. Considering an example in which the image coding standard is HEVC, since HEVC supports image blocks of 4×4, 8×8, 16×16, 32×32, and 64×64 pixels, the preset division manner is to divide the processed current image frame into the plurality of current image sub-blocks and divide the processed reference image frame into the plurality of reference image sub-blocks by using the size of 4×4 pixels.

Figure 6:
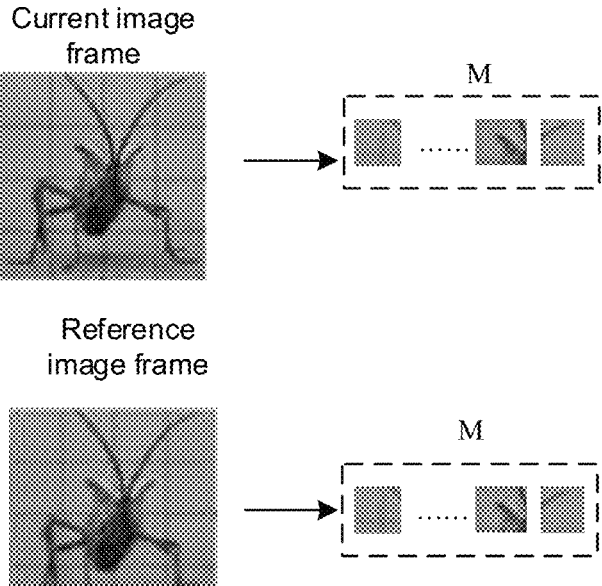
FIG. 6 is a diagram showing an application of yet another image processing method provided in with some embodiments of the present disclosure.

As shown in FIG. 6, considering an example in which the image coding standard is HEVC, by using the preset division manner of 4×4 pixels, the processed current image frame is divided into M current image sub-blocks and the processed reference image frame is divided into M current image sub-blocks.

The specific number of the plurality of current image sub-blocks is related to the size of the current image frame and the preset division manner, and the specific number of the plurality of reference image sub-blocks is related to the size of the reference image frame and the preset division manner. The embodiments of the present disclosure do not limit the specific number of the plurality of current image sub-blocks and the specific number of the plurality of reference image sub-blocks.

In 204, a reference image sub-block with the minimum similarity to each current image sub-block among the plurality of reference image sub-blocks is determined as a matching block of the current image sub-block.

Determining the matching block of the current image sub-block among the plurality of reference image sub-blocks includes steps 1 to 3.

In step 1, within a search area corresponding to the current image sub-block, distances between reference image sub-blocks within the search area and the current image sub-block are calculated.

Each current image sub-block corresponds to a search area, search areas corresponding to different image sub-blocks may be different, and the search areas corresponding to different image sub-blocks may include the same image block. The embodiments of the present disclosure do not limit the size of the search area corresponding to each current image sub-block and the positional relationship between the search area and the current image sub-block, and the size of the search area corresponding to the current image sub-block is related to the image coding standard.

For example, the image coding standard is HEVC, the processed current image frame is divided into a plurality of current image sub-blocks using the preset division manner of 4×4 pixels, and the search area corresponding to the current image sub-block refers to searching in the square around the current image sub-block with a radius equal to 16 pixels or a radius equal to 32 pixels, etc.

Optionally, the distances between the reference image sub-blocks within the search area and the current image sub-block are calculated by mean squared error (MSE):

$$D_{i,j} = MSE(K_i, Q_j)$$

Here, $D_{i,j}$ represents the distance between the reference image sub-block and the current image sub-block, $K_i$ represents the current image sub-block, and $Q_j$ represents the reference image sub-block.

Figure 7:
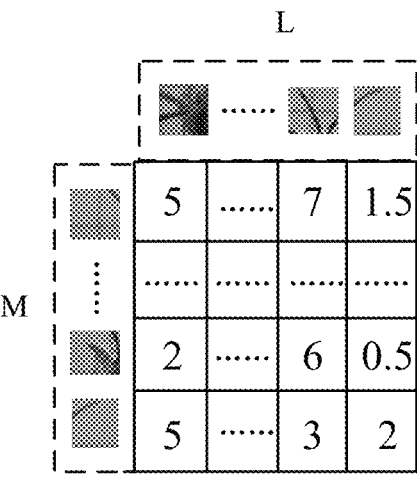
FIG. 7 is a diagram showing an application of yet another image processing method provided in some embodiments of the present disclosure.

In conjunction with FIG. 6, as shown in FIG. 7, considering an example in which the processed current image frame is divided into M current image sub-blocks, L reference image sub-blocks in FIG. 7 are image blocks within the search area corresponding to the current image sub-block, and the distances between the reference image sub-blocks and the current image sub-block are calculated through MSE. The closer the distance, the higher the similarity between two image blocks.

In step 2, regularization is performed on the distances between the reference image sub-blocks within the search area and the current image sub-block to obtain a plurality of candidate similarities.

The embodiments of the present disclosure do not limit the specific processing manner of the regularization. The smaller the similarity obtained by the regularization processing, the smaller the difference between the reference image sub-block and the current image sub-block, and the more similar the reference image sub-block is to the current image sub-block.

For example, the distances between the reference image sub-blocks within the search area and the current image sub-block are regularized by the following formula:

$$S_{i,j} = \frac{D_{i,j}}{\alpha + {}_{h}^{min} D_{h,j}}$$

Here, $S_{i,j}$ represents the similarity between the reference image sub-block and the current image sub-block, $D_{i,j}$ represents the distance between the reference image sub-block and the current image sub-block, and $\alpha$ is a non-zero parameter, and ${}_{h}^{min}D_{h,j}$ represents the minimum distance $D_{i,j}$ among the distances between the current image sub-block and the reference image sub-blocks.

Figure 8:
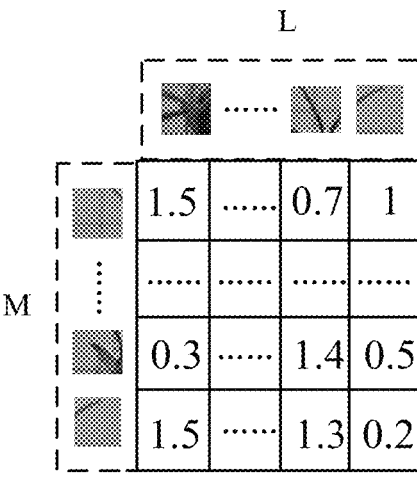
FIG. 8 is a diagram showing an application of yet another image processing method provided in some embodiments of the present disclosure.

As shown in FIG. 8, considering an example in which the processed current image frame is divided into M current image sub-blocks and the search area of the current image sub-block includes L reference image sub-blocks, a plurality of candidate similarities are obtained by performing the regularization on the distances between the reference image sub-blocks and the current image sub-block.

In step 3, a reference image sub-block corresponding to the minimum similarity among the plurality of candidate similarities is determined as a matching block of the current image sub-block.

Optionally, the matching block of the current image sub-block is determined by the following formula:

$$j_{nn}(i) = \arg{}_{h}^{min}S_{i,h}$$

Here, $j_{nn}(i)$ represents the reference image sub-block (the matching block) corresponding to the current image sub-block, and $\arg_{min}{}^{h}s_{i,h}$ represents searching for the reference image sub-block corresponding to the minimum similarity among the plurality of candidate similarities.

Figure 9:
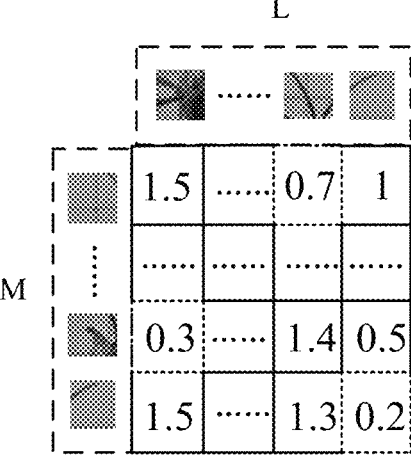
FIG. 9 is a diagram showing an application of yet another image processing method provided in some embodiments of the present disclosure.

As shown in FIG. 9, considering an example in which the processed current image frame is divided into M current image sub-blocks and the search area of the current image sub-block includes L reference image sub-blocks, the reference image sub-block corresponding to the minimum similarity among the plurality of candidate similarities is found through $j_{nn}(i)$. That is, reference image sub-blocks corresponding to the minimum similarities such as 0.7, 0.3 and 0.2 are the matching blocks of the current image sub-blocks.

In the image processing method provided by the embodiments of the present disclosure, by calculating the distances between the reference image sub-blocks and the current image sub-block and processing the distances, the reference image sub-block corresponding to the minimum similarity is determined as the matching block of the current image sub-block, which can ensure that the obtained matching block is the optimal matching block of the current image sub-block.

In 205, based on each current image sub-block and the matching block corresponding to the current image sub-block, a motion vector corresponding to the current image sub-block is obtained.

According to different image coding standards, the number of times that the current image frame and the reference image frame can be scaled is different, and the number of obtained motion vectors corresponding to the current image sub-block is also different. The embodiments of the present disclosure do not limit the specific type of the image coding standard that is used and the specific number of motion vectors that are obtained.

Figure 10:
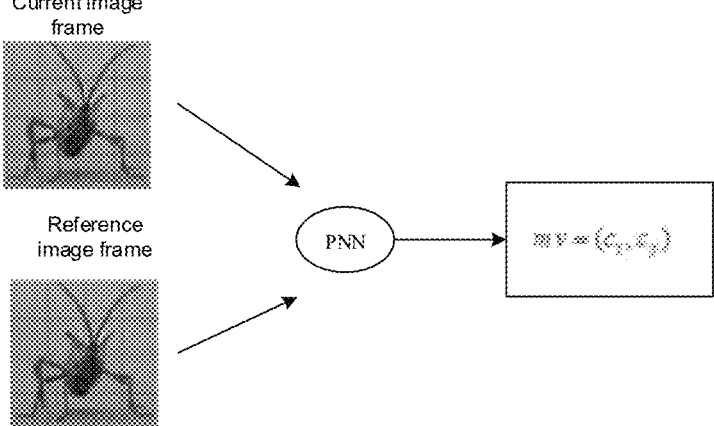
FIG. 10 is a diagram showing an application of yet another image processing method provided in some embodiments of the present disclosure.

As shown in FIG. 10, the above-mentioned steps 203 and 204 are executed by a patches nearest neighbors (PNN) module, and as for details of the execution steps of the PNN module, reference is made to the relevant content of the above-mentioned 203 and 204. Considering an example in which the image coding standard is MPEG2, the current image frame and the reference image frame are not scaled; and according to the current image sub-blocks and the matching blocks corresponding to the current image sub-blocks, a group of motion vectors $mv=(c_x, c_y)$ corresponding to the current image sub-blocks may be obtained, where $(c_x, c_y)$ represents relative coordinates of the current image block and the matching block.

Optionally, if the current image frame and the reference image frame can be scaled multiple times, under each image scale, according to the current image sub-block and the matching block corresponding to the current image sub-block, a motion vector corresponding to the current image sub-block is obtained. Therefore, after the image is scaled multiple times, for each current image sub-block, a plurality of groups of motion vectors are obtained:

$$mv = (K^g c_x, K^g c_y)$$

Here, K represents a scaling factor, and g represents different scaling levels corresponding to the current image sub-block.

Figure 11:
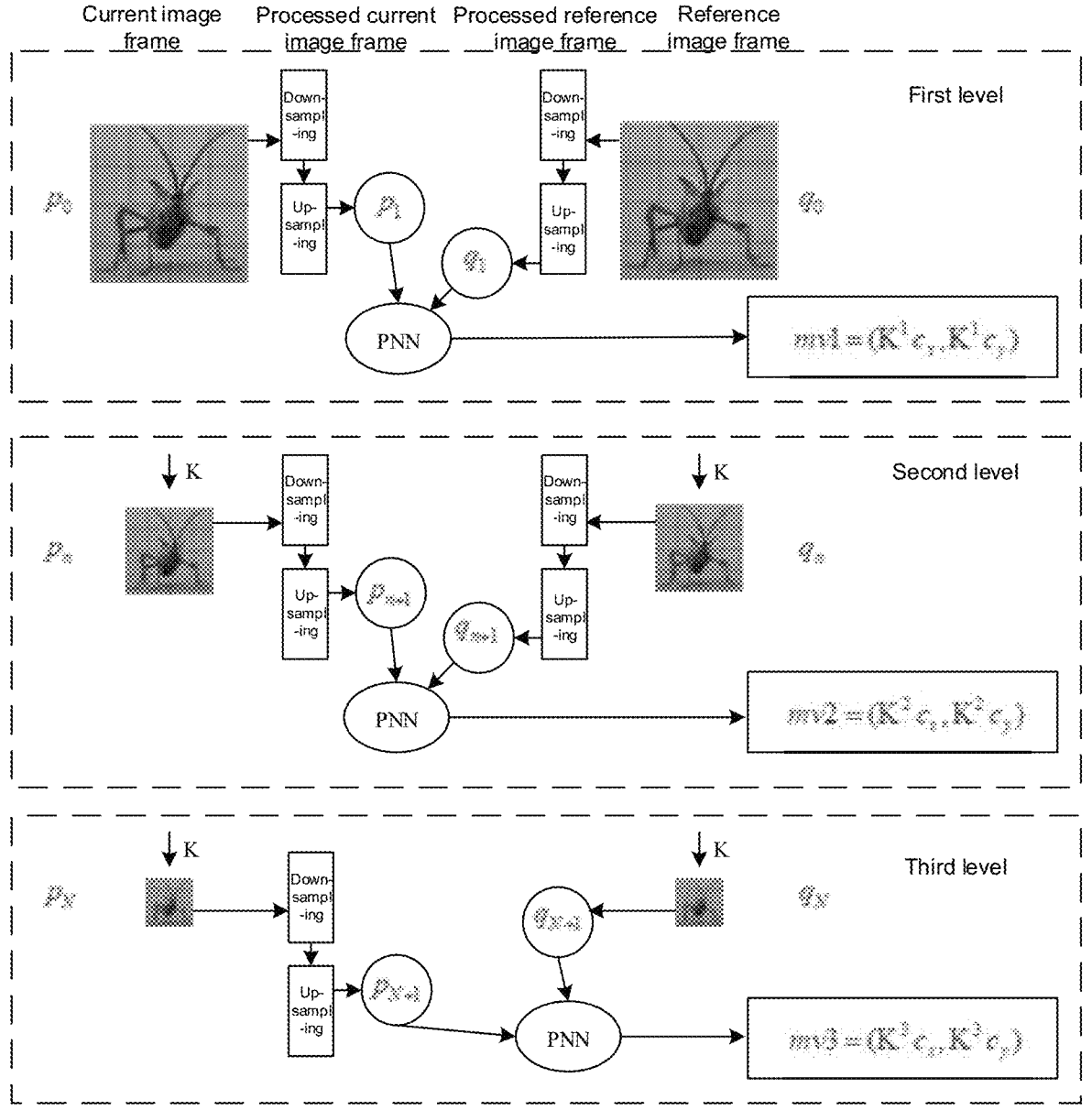
FIG. 11 is a diagram showing an application of yet another image processing method provided in some embodiments of the present disclosure.

As shown in FIG. 11, considering an example in which the current image frame and the reference image frame can be scaled twice and have 3 scaled levels, for the first level, the motion vector $mv1=(K^1 c_x, K^1 c_y)$; for the second level, the motion vector $mv2=(K^2 c_x, K^2 c_y)$; and for the third layer, the motion vector $mv3=(K^3 c_x, K^3 c_y)$. That is, after the motion vector $(c_x, c_y)$ between the matching block of the current image sub-block is obtained at each level, the motion vector $(c_x, c_y)$ needs to be multiplied by $K^g$ to obtain the corresponding motion vector of the current image block when it is not compressed.

In 206, the current image frame is encoded based on the motion vector.

If motion vectors corresponding to a group of current image sub-blocks are obtained based on each current image sub-block and the matching block corresponding to the current image sub-block, the current image frame is encoded based on the motion vectors.

In the image processing method provided in the embodiments of the present disclosure, by sequentially performing downsampling and upsampling on the current image frame and the reference image frame, it can reduce the high-frequency parts that do not represent the main information in the current image frame and the reference image frame and filter the noise signals; and then by dividing the processed current image frame and the processed reference image frame into image blocks, it can obtain the optimal matching block of each current image sub-block accurately. Therefore, the motion vectors obtained according to the optimal matching blocks are accurate; and when coding the current image frame based on the motion vectors, the size of the bit stream can be reduced and the image quality can be improved.

As shown in FIG. 12, if motion vectors corresponding to a plurality of groups of current image sub-blocks are obtained based on each current image sub-block and the matching block corresponding to the current image sub-block, the image processing method provided in the embodiments of the present disclosure includes the above steps 201 to 206, and may further include step 207 before step 206.

In 207, according to a first similarity corresponding to a first current image sub-block and a second similarity corresponding to a second current image sub-block, a target motion vector is determined from a first motion vector corresponding to the first current image sub-block and a second motion vector corresponding to the second current image sub-block. The first current image sub-block is an image block obtained by scaling the second current image sub-block.

Optionally, the first current image sub-block may be the image block obtained by scaling the second current image sub-block once, and the first current image sub-block may also be the image block obtained by scaling the second current image sub-block multiple times. The embodiments of the present disclosure do not limit the specific number of times of scaling the second current image sub-block to obtain the image block serving as the first current image sub-block.

The second current image sub-block includes a plurality of current image sub-blocks, and each current image sub-block corresponds to one second similarity. The embodiments of the present disclosure do not limit the number of the current image sub-blocks included in the second current image sub-block, and the number of the current image sub-blocks included in the second current image sub-block is related to parameters such as the scaling factor.

For example, as shown in FIG. 3, the first current image sub-block is an image block in the current image frame of 320×320 pixels, the second current image sub-block is an image block in the current image frame of 640×640 pixels, and the sizes of the first current image sub-block and the second current image sub-block are both 4×4; the current image frame of 320×320 pixels is the image frame obtained after scaling the current image frame of 640×640 pixels once, and the scale of the current image frame of 320×320 pixels is smaller than the scale of the current image frame of 640×640 pixels; therefore, one first current image sub-block of 4×4 in the current image frame of 320×320 pixels corresponds to four second current image sub-blocks of 4×4 in the current image frame of 640×640 pixels. That is to say, the four second current image sub-blocks of 4×4 may be scaled once to obtain one first current image sub-block of 4×4.

The first similarity is compared with the second similarity; when the first similarity is less than or equal to the second similarity, the first motion vector is determined as the target motion vector; and when the first similarity is greater than the second similarity, the second motion vector is determined as the target motion vector.

As shown in FIG. 13, for example, the scaling factor K is equal to 2, the first current image sub-block includes 1 image sub-block, the first similarity is $S_0$, and the first current image sub-block is the image block obtained by scaling the second current image sub-block once; the second current image sub-block includes 4 image sub-blocks, and the second similarities include $S_1$, $S_2$, $S_3$ and $S_4$. The first similarity $S_0$ and the second similarities $S_1$ to $S_4$ are compared in sequence; in a case where the first similarity $S_0$ is less than or equal to the second similarities $S_1$ to $S_4$, the first motion vector is determined as the target motion vector; and in a case where the first similarity $S_0$ is greater than any second similarity of $S_1$ to $S_4$, the second motion vector is determined as the target motion vector.

Correspondingly, for step 206, the current image frame is encoded based on the target motion vector determined in step 207.

Optionally, the above steps 203 to 207 may be processed in parallel by using a tensor processing framework, e.g., Pytorch (python torch) and Tensorflow, to improve processing efficiency. The embodiments of the present disclosure do not limit the specific type of tensor processing framework for performing computing in parallel.

Optionally, a graphics processing unit (GPU) may be used to improve coding efficiency.

In the image processing method provided in the embodiments of the present disclosure, when scaling the current image frame and the reference image frame, a group of motion vectors and a group of similarities may be obtained under each scale, so a plurality of groups of similarities under different scales of the current image block need to be compared, and the optimal motion vector is determined. Moreover, the when determining the optimal motion vector in the solutions, if the similarity of the large block is higher than the similarity of the small block, the motion vector corresponding to the large block is used as the optimal motion vector; if the similarity of the large block is lower than the similarity of the small block, the motion vector corresponding to the small block is used as the optimal motion vector. Therefore, the optimal motion vector may be selected under different scales, and in turn the accuracy of the motion vector may be improved. In addition, through the solutions, the current image frame may be divided into image blocks of different sizes for coding. It can be understood that a smaller similarity value indicates a higher similarity, and a larger similarity value indicates a lower similarity.

Embodiments of the present disclosure provide an image processing device, and the device may be an image encoder. The image processing device is used to perform steps 201 to 207 in the above image processing method. The image processing device provided in the embodiments of the present disclosure includes modules corresponding to the steps.

In the embodiments of the present disclosure, the image processing device is divided into functional modules according to the foregoing methods and examples. For example, the image processing device may be divided in a way that each functional module corresponds to a function, or that two or more functions are integrated into one functional module. The integrated module may be implemented in a form of hardware or in a form of software functional module. The division of modules in the embodiments of the present disclosure is schematic, and is only a division according to logical functions, and there may be other division manners in actual implementation.

Figure 14:
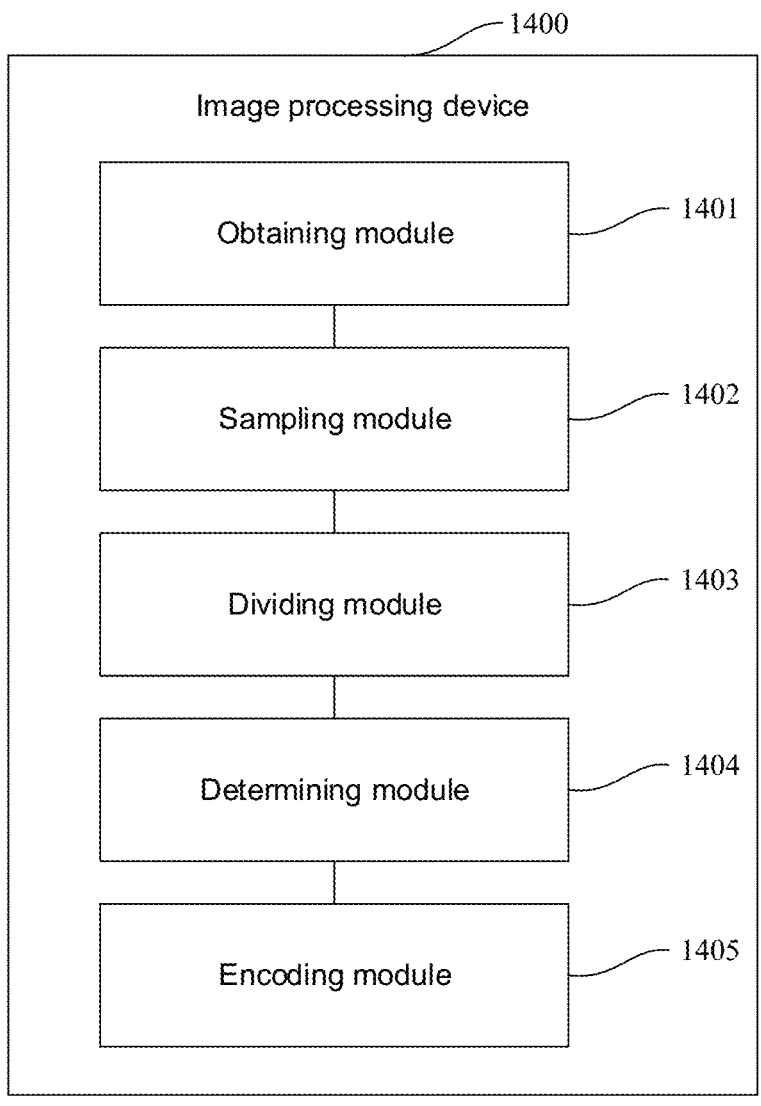
FIG. 14 is a structural diagram of an image processing device provided in some embodiments of the present disclosure.

In a case where the functional modules are divided using the corresponding functions, FIG. 14 is a schematic diagram showing a possible structure of the image processing device involved in the above embodiments. As shown in FIG. 14, the image processing device 1400 includes an obtaining module 1401, a sampling module 1402, a dividing module 1403, a determining module 1404, and an encoding module 1405. The functions of the modules are as follows.

The obtaining module 1401 is used to obtain the current image frame and the reference image frame.

The sampling module 1402 is used to sequentially perform downsampling and upsampling on the current image frame to obtain the processed current image frame and sequentially perform downsampling and upsampling on the reference image frame to obtain the processed reference image frame.

The dividing module 1403 is used to, according to a preset division manner, divide the processed current image frame into a plurality of current image sub-blocks and divide the processed reference image frame into a plurality of reference image sub-blocks.

The determining module 1404 is used to determine, among the plurality of reference image sub-blocks, a reference image sub-block with the minimum similarity to each current image sub-block as a matching block of the current image sub-block.

The determining module 1404 is further used to obtain motion vectors corresponding to the current image sub-blocks based on each current image sub-block and the matching block corresponding to the current image sub-block.

The encoding module 1405 is used to encode the current image frame based on the motion vectors.

In a feasible implementation, the current image frame is an original current image frame or an image frame obtained after scaling the original current image frame at least once by using the scaling factor K, and the reference image frame is an original reference image frame or an image frame obtained after scaling the original reference image frame at least once by using the scaling factor K.

In a feasible implementation, the determining module 1404 is used to: within a search area corresponding to the current image sub-block, calculate distances between reference image sub-blocks within the search area and the current image sub-block; perform regularization on the distances between the reference image sub-blocks within the search area and the current image sub-block to obtain a plurality of candidate similarities; and determine a reference image sub-block corresponding to the minimum similarity among the plurality of candidate similarities as the matching block of the current image sub-block.

In a feasible implementation, the minimum similarity among the plurality of candidate similarities corresponding to each current image sub-block is the similarity corresponding to the current image sub-block.

In a feasible implementation, the determining module 1404 is further used to, according to a first similarity corresponding to a first current image sub-block and a second similarity corresponding to a second current image sub-block, determine a target motion vector from a first motion vector corresponding to the first current image sub-block and a second motion vector corresponding to the second current image sub-block. The first current image sub-block is an image block obtained by scaling the second current image sub-block.

In a feasible implementation, the determining module 1404 is used to: compare the first similarity with the second similarity; if the first similarity is less than or equal to the second similarity, determine the first motion vector as the target motion vector; and if the first similarity is greater than the second similarity, determine the second motion vector as the target motion vector.

In a feasible implementation, the encoding module 1405 is used to encode the current image frame based on the target motion vector.

Some embodiments of the present disclosure provide a computer-readable storage medium (for example, a non-transitory computer-readable storage medium). The computer-readable storage medium has stored computer program instructions, and the computer program instructions, when executed by a computer (for example, an image processing device), cause the computer to perform the image processing method as described in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD), etc.), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure further provide a computer program product. For example, the computer program product is stored on a non-transitory computer-readable storage medium. The computer program product includes computer program instructions, and when the computer program instructions are executed by a computer (for example, an image processing device), the computer program instructions cause the computer to perform the image processing method as described in the above embodiments.

Some embodiments of the present disclosure further provide a computer program. When the computer program is executed by a computer (e.g., an image processing device), the computer program causes the computer to perform the image processing method as described in the above embodiments.

Beneficial effects of the computer-readable storage medium, the computer program product and the computer program are the same as the beneficial effects of the image processing method as described in the above embodiments, and details will not be repeated here.

The foregoing descriptions are merely specific implementation manners of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure should be determined by the protection scope of the claims.

What is claimed is:

1. An image processing method, comprising:
obtaining a current image frame and a reference image frame;
sequentially performing downsampling and upsampling on the current image frame to obtain a processed current image frame, and sequentially performing downsampling and upsampling on the reference image frame to obtain a processed reference image frame;
according to a preset division manner, dividing the processed current image frame into a plurality of current image sub-blocks and dividing the processed reference image frame into a plurality of reference image sub-blocks;
determining a reference image sub-block with a minimum similarity to each current image sub-block among the plurality of reference image sub-blocks as a matching block of the current image sub-block;
obtaining a motion vector corresponding to the current image sub-block based on each current image sub-block and the matching block corresponding to the current image sub-block; and
encoding the current image frame based on the motion vector.

2. The method according to claim 1, wherein the current image frame is an original current image frame or an image frame obtained after scaling the original current image frame at least once by using a scaling factor, and the reference image frame is an original reference image frame or an image frame obtained after scaling the original reference image frame at least once by using the scaling factor.

3. The method according to claim 2, wherein determining the reference image sub-block with the minimum similarity to each current image sub-block among the plurality of reference image sub-blocks as the matching block of the current image sub-block includes:
within a search area corresponding to the current image sub-block, calculating distances between reference image sub-blocks within the search area and the current image sub-block;
performing regularization on the distances between the reference image sub-blocks within the search area and the current image sub-block to obtain a plurality of candidate similarities; and
determining a reference image sub-block corresponding to a minimum similarity among the plurality of candidate similarities as the matching block of the current image sub-block.

4. The method according to claim 3, wherein the minimum similarity among the plurality of candidate similarities corresponding to each current image sub-block is a similarity corresponding to the current image sub-block.

5. The method according to claim 4, further comprising:
according to a first similarity corresponding to a first current image sub-block and a second similarity corresponding to a second current image sub-block, determining a target motion vector from a first motion vector corresponding to the first current image sub-block and a second motion vector corresponding to the second current image sub-block; wherein the first current image sub-block is an image block obtained by scaling the second current image sub-block.

6. The method according to claim 5, wherein according to the first similarity corresponding to the first current image sub-block and the second similarity corresponding to the second current image sub-block, determining the target motion vector from the first motion vector corresponding to the first current image sub-block and the second motion vector corresponding to the second current image sub-block, includes:
comparing the first similarity with the second similarity;
in a case where the first similarity is less than or equal to the second similarity, determining the first motion vector as the target motion vector; and
in a case where the first similarity is greater than the second similarity, determining the second motion vector as the target motion vector.

7. The method according to claim 6, wherein encoding the current image frame based on the motion vector includes:
encoding the current image frame based on the target motion vector.

8. The method according to claim 5, wherein encoding the current image frame based on the motion vector includes:
encoding the current image frame based on the target motion vector.

9. A non-transitory computer-readable storage medium having stored computer program instructions, wherein the computer program instructions, when executed by a computer, cause the computer to perform:
obtaining a current image frame and a reference image frame;
sequentially performing downsampling and upsampling on the current image frame to obtain a processed current image frame, and sequentially performing downsampling and upsampling on the reference image frame to obtain a processed reference image frame;
according to a preset division manner, dividing the processed current image frame into a plurality of current image sub-blocks and dividing the processed reference image frame into a plurality of reference image sub-blocks;

determining a reference image sub-block with a minimum similarity to each current image sub-block among the plurality of reference image sub-blocks as a matching block of the current image sub-block;

obtaining a motion vector corresponding to the current image sub-block based on each current image sub-block and the matching block corresponding to the current image sub-block; and encoding the current image frame based on the motion vector.

10. The non-transitory computer-readable storage medium according to claim 9, wherein the current image frame is an original current image frame or an image frame obtained after scaling the original current image frame at least once by using a scaling factor, and the reference image frame is an original reference image frame or an image frame obtained after scaling the original reference image frame at least once by using the scaling factor.

11. The non-transitory computer-readable storage medium according to claim 10, wherein the computer program instructions, when executed by the computer, cause the computer to perform:

within a search area corresponding to the current image sub-block, calculating distances between reference image sub-blocks within the search area and the current image sub-block;

performing regularization on the distances between the reference image sub-blocks within the search area and the current image sub-block to obtain a plurality of candidate similarities; and determining a reference image sub-block corresponding to a minimum similarity among the plurality of candidate similarities as the matching block of the current image sub-block.

12. The non-transitory computer-readable storage medium according to claim 11, wherein the minimum similarity among the plurality of candidate similarities corresponding to each current image sub-block is a similarity corresponding to the current image sub-block.

13. The non-transitory computer-readable storage medium according to claim 12, wherein the computer program instructions, when executed by the computer, cause the computer to further perform: according to a first similarity corresponding to a first current image sub-block and a second similarity corresponding to a second current image sub-block, determining a target motion vector from a first motion vector corresponding to the first current image sub-block and a second motion vector corresponding to the second current image sub-block; wherein the first current image sub-block is an image block obtained by scaling the second current image sub-block.

14. The non-transitory computer-readable storage medium according to claim 13, wherein the computer program instructions, when executed by the computer, cause the computer to perform: comparing the first similarity with the second similarity; in a case where the first similarity is less than or equal to the second similarity, determining the first motion vector as the target motion vector; and in a case where the first similarity is greater than the second similarity, determining the second motion vector as the target motion vector.

15. The non-transitory computer-readable storage medium according to claim 13, wherein the computer program instructions, when executed by the computer, cause the computer to perform: encoding the current image frame based on the target motion vector.

16. A computer program product, stored on a non-transitory computer-readable storage medium, comprising computer program instructions, wherein the computer program instructions, when executed by a computer, cause the computer to perform:

obtaining a current image frame and a reference image frame;

sequentially performing downsampling and upsampling on the current image frame to obtain a processed current image frame, and sequentially performing downsampling and upsampling on the reference image frame to obtain a processed reference image frame;

according to a preset division manner, dividing the processed current image frame into a plurality of current image sub-blocks and dividing the processed reference image frame into a plurality of reference image sub-blocks;

determining a reference image sub-block with a minimum similarity to each current image sub-block among the plurality of reference image sub-blocks as a matching block of the current image sub-block;

obtaining a motion vector corresponding to the current image sub-block based on each current image sub-block and the matching block corresponding to the current image sub-block; and encoding the current image frame based on the motion vector.

17. The computer program product according to claim 16, wherein the current image frame is an original current image frame or an image frame obtained after scaling the original current image frame at least once by using a scaling factor, and the reference image frame is an original reference image frame or an image frame obtained after scaling the original reference image frame at least once by using the scaling factor.

18. The computer program product according to claim 17, wherein the computer program instructions, when executed by the computer, cause the computer to perform:

within a search area corresponding to the current image sub-block, calculating distances between reference image sub-blocks within the search area and the current image sub-block;

performing regularization on the distances between the reference image sub-blocks within the search area and the current image sub-block to obtain a plurality of candidate similarities; and determining a reference image sub-block corresponding to a minimum similarity among the plurality of candidate similarities as the matching block of the current image sub-block.

19. The computer program product according to claim 18, wherein the minimum similarity among the plurality of candidate similarities corresponding to each current image sub-block is a similarity corresponding to the current image sub-block.

20. The computer program product according to claim 19, wherein the computer program instructions, when executed by the computer, cause the computer to further perform: according to a first similarity corresponding to a first current image sub-block and a second similarity corresponding to a second current image sub-block, determining a target motion vector from a first motion vector corresponding to the first current image sub-block and a second motion vector corresponding to the second current image sub-block;

wherein the first current image sub-block is an image block obtained by scaling the second current image sub-block.

\* \* \* \* \*